US012103266B2

(12) United States Patent
Chow et al.

(10) Patent No.: US 12,103,266 B2
(45) Date of Patent: Oct. 1, 2024

(54) FLEXIBLE HIGH-PRESSURE FLUID CONVEYING PIPE

(71) Applicant: KURARAY CO., LTD., Kurashiki (JP)

(72) Inventors: Edgard Chow, Houston, TX (US); Astrid Torres, Houston, TX (US)

(73) Assignee: KURARAY CO., LTD., Kurashiki (JP)

( * ) Notice: Subject to any disclaimer, the term of this patent is extended or adjusted under 35 U.S.C. 154(b) by 122 days.

(21) Appl. No.: 17/161,730

(22) Filed: Jan. 29, 2021

(65) Prior Publication Data

US 2021/0237390 A1 Aug. 5, 2021

Related U.S. Application Data

(60) Provisional application No. 62/967,906, filed on Jan. 30, 2020.

(51) Int. Cl.

| | |
|---|---|
| *B32B 1/08* | (2006.01) |
| *B32B 7/12* | (2006.01) |
| *B32B 17/02* | (2006.01) |
| *B32B 17/10* | (2006.01) |
| *B32B 27/12* | (2006.01) |
| *B32B 27/30* | (2006.01) |
| *B32B 27/32* | (2006.01) |
| *F16L 11/08* | (2006.01) |
| *F17D 5/00* | (2006.01) |

(52) U.S. Cl.
CPC ............ *B32B 1/08* (2013.01); *B32B 7/12* (2013.01); *B32B 17/02* (2013.01); *B32B 17/10* (2013.01); *B32B 27/12* (2013.01); *B32B 27/306* (2013.01); *B32B 27/32* (2013.01); *F16L 11/08* (2013.01); *F17D 5/00* (2013.01); *B32B 2250/05* (2013.01); *B32B 2262/101* (2013.01); *B32B 2597/00* (2013.01)

(58) Field of Classification Search
CPC .. B32B 1/08; B32B 7/12; B32B 17/02; B32B 17/10; B32B 27/12; B32B 27/306; B32B 27/32; B32B 2250/05; B32B 2262/101; B32B 2597/00; F16L 11/08; F17D 5/00
See application file for complete search history.

(56) References Cited

U.S. PATENT DOCUMENTS

| | | |
|---|---|---|
| 2013/0040087 A1 | 2/2013 | Kazeto et al. |
| 2015/0140247 A1 | 5/2015 | Shibutani et al. |
| 2015/0376372 A1 | 12/2015 | Kazeto et al. |

FOREIGN PATENT DOCUMENTS

| | | |
|---|---|---|
| EP | 2 554 592 A1 | 2/2013 |
| EP | 2 881 639 A1 | 6/2015 |
| JP | 2009-92095 A | 4/2009 |

(Continued)

OTHER PUBLICATIONS

English machine translation of JP2016-069481. (Year: 2016).*

(Continued)

*Primary Examiner* — Michael C Miggins
(74) *Attorney, Agent, or Firm* — Oblon, McClelland, Maier & Neustadt, L.L.P.

(57) ABSTRACT

A flexible pipe comprising at least one layer of ethylene-vinyl alcohol resin (EVOH) as the innermost layer, wherein the pipe is suitable for use under high pressure, is configured to retain mechanical properties at pressures up to at least about 1500 psig, and can also retain its structural function upon decompression.

5 Claims, 1 Drawing Sheet

(56) References Cited

FOREIGN PATENT DOCUMENTS

JP        2016-69481 A      5/2016
WO    WO 2018/00091 A1    1/2018

OTHER PUBLICATIONS

English machine translation of JP2005-030512 (Year: 2005).*
English machine translation for JP2003-065469 (2003). (Year: 2003).*
International Search Report and Written Opinion of the International Searching Authority issued May 19, 2021 in PCT/US2021/016072, 12 pages.

* cited by examiner

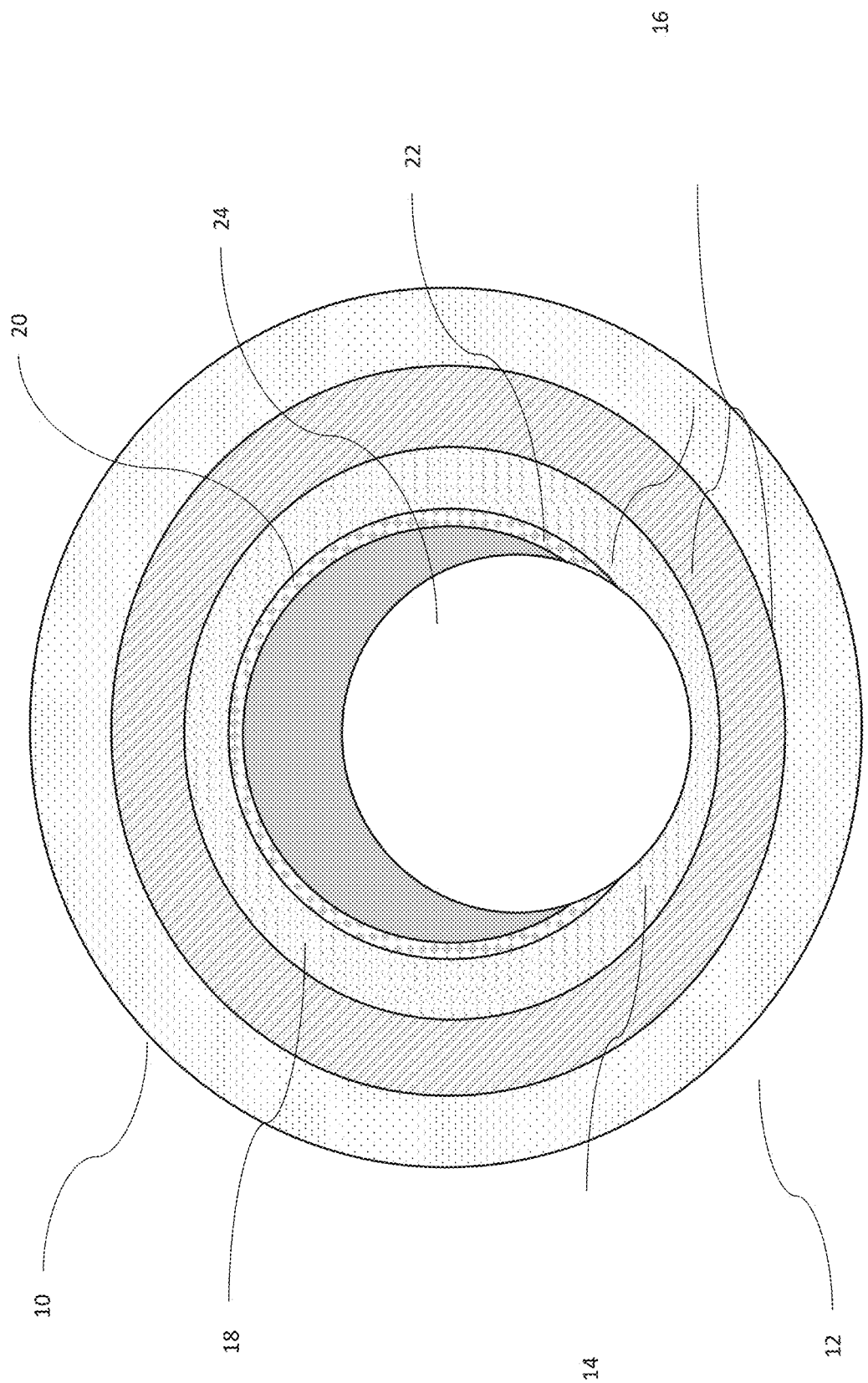

FLEXIBLE HIGH-PRESSURE FLUID CONVEYING PIPE

CROSS-REFERENCE TO RELATED APPLICATIONS

This application claims priority under 35 U.S.C. § 119 from U.S. Provisional Application Ser. No. 62/967,906, filed 30 Jan. 2020, the disclosure of which is incorporated by reference herein for all purposes as if fully set forth.

FIELD OF THE INVENTION

The present invention relates to a flexible pipe comprising at least one layer of ethylene-vinyl alcohol resin (EVOH) composition, which pipe is suitable for conveying fluids under high pressure, while retaining its structural function upon decompression. The present invention also relates to a method of transporting a high-pressure fluid with such a flexible pipe, wherein the pipe is configured to retain mechanical properties at pressures of about 1500 psig or less.

BACKGROUND OF THE INVENTION

Fuel and gas pipes are conventionally constructed of materials such as polyethylene, polypropylene, polyamide, polyphenylene sulfide, polyether ether ketone, and the like; however, in order to satisfy the required strength and barrier properties, the thickness of the pipe must inevitably be increased. As a result, such pipes do not have sufficient flexibility are uses are limited.

Recently, flexible multilayer pipes with at least one polymer layer have been used to convey fluids under pressure such as natural gas, sour gas, carbon dioxide, hydrocarbons, etc. An ideal flexible pipe can be wound, handled, bent, etc. without causing collapse, buckling, tearing, cracking, etc., even in a low temperature environment. Furthermore, it is desirable that the flexible pipe also be able to contain a high-pressure flow in a high-temperature environment. Under such conditions, however, the fluids (such as gases) may permeate through the inner pipe wall and other layers, particularly under an environment where the pressure changes rapidly. The result is that these permeated gases may build up in the pipe wall between layers and can cause failures.

EVOH is well-known as a crystalline polymer combining the excellent gas barrier and organic solvent-resistance properties of polyvinyl alcohol, with melt processability and water resistance of polyethylene (PE), and is applied in an extensive range of applications. For example, EVOH-containing multilayer pipe has been used for floor heating pipes, and oil and gas pipes, due to oxygen gas barrier properties, and oil and gas resistance. JP2009092095A describes a PE/tie/EVOH/tie/PE multilayer pipe which has good gas barrier and durability. Also, WO2018/00091A1 discloses a polymeric pipe with axial venting elements to release permeated gases that build up in the wall. The gas barrier performance of these pipes in some applications under a severe pressure environment where the pressure changes rapidly, however, is not generally discussed.

Recently, a rapid gas decompression (RGD) test is used to evaluate the resistance to failures caused by high-pressure gases. RGD is typically known as the failure mechanism observed in materials when they undergo rapid decompression after being exposed to gaseous media for a prolonged period of time. The RGD of a material depends on the permeability, diffusion coefficients, and solubility of the gas in the material. As it relates to RGD for multilayer pipe systems, the test consists of conditioning a pipe specimen with closed ends to $CO_2$ pressurized to 1,500 pounds per square inch (psia) at a temperature of 82° C. Conventional PE pipes cannot pass this test due to the gases that permeate through the pipe wall under the condition where the pressure changes rapidly. The PE/tie/EVOH/tie/PE multilayer pipe previously disclosed was also tested by RGD test, but failed as the inner PE layer swelled. As a result, such pipe could not retain its structural function upon decompression due to delamination of the adjacent tie/PE interfaces.

In order to address the above problem, the present invention provides a high-pressure fluid conveying pipe having a desirable combination of good flexibility and barrier properties for use under high pressure, and which can also retain its structural integrity upon decompression.

SUMMARY OF THE INVENTION

In view of the above background, an objective of the present invention is to provide a high-pressure fluid conveying pipe having flexibility and excellent barrier properties required for applications under severe pressure conditions.

The present invention addresses the above-described problem by providing a pipe comprising a sheath layer, a reinforcing layer contained by the sheath layer, an inner layer contained by the reinforcing layer, and a hollow portion contained by the inner layer, wherein the pipe is flexible, and wherein the inner layer is a multilayer article having an innermost layer containing the hollow portion, wherein the innermost layer is a layer of the ethylene-vinyl alcohol copolymer resin composition.

In one embodiment, the multilayer article has a 3-layer structure (PO)/(AD)/(X), wherein (X) is a layer of the ethylene-vinyl alcohol resin composition, (PO) is a layer of a hydrophobic thermoplastic resin composition, and (AD) is a layer of an adhesive resin composition.

In another embodiment, the ethylene-vinyl alcohol resin composition comprises a predominant amount of an ethylene-vinyl alcohol copolymer having a degree of saponification of about 99 mol % or greater.

In another embodiment, the ethylene-vinyl alcohol resin composition comprises a predominant amount of an ethylene-vinyl alcohol copolymer having an ethylene content of about 18 mol % or greater and about 55 mol % or less.

In another embodiment, the multilayer article has an average thickness of from about 5 mm to about 50 mm.

In another embodiment, the layer of the ethylene-vinyl alcohol copolymer resin composition has an average thickness of from about 15 μm to about 600 μm.

The present invention also provides a method of transporting high-pressure fluid through a pipe at a pressure of about 1500 psig or less, or from about 200 psig to about 1500 psig, wherein the pipe is as set forth above and as further described below.

These and other embodiments, features and advantages of the present invention will be more readily understood by those of ordinary skill in the art from a reading of the following detailed description.

BRIEF DESCRIPTION OF THE DRAWINGS

FIG. 1 is a diagram of a first embodiment of a pipe in accordance with the present invention.

DETAILED DESCRIPTION

The present invention relates to a pipe that is flexible and suitable for conveying a high-pressure fluid.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute. Pressure differences, however, are expressed as absolute (for example, pressure 1 is 25 psi higher than pressure 2).

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used, it is used to mean a certain effect or result can be obtained within a certain tolerance, and the skilled person knows how to obtain the tolerance. When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Optional additives as defined herein, at a level that is appropriate for such additives, and minor impurities are not excluded from a composition by the term "consisting essentially of".

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "predominant portion" or "predominantly", as used herein, unless otherwise defined herein, means greater than 50% of the referenced material. If not specified, the percent is on a molar basis when reference is made to a molecule (such as hydrogen and ethylene), and otherwise is on a mass or weight basis (such as for additive content).

The term "substantial portion" or "substantially", as used herein, unless otherwise defined, means all or almost all or the vast majority, as would be understood by the person of ordinary skill in the context used. It is intended to take into account some reasonable variance from 100% that would ordinarily occur in industrial-scale or commercial-scale situations.

The term "depleted" or "reduced" is synonymous with reduced from originally present. For example, removing a substantial portion of a material from a stream would produce a material-depleted stream that is substantially depleted of that material. Conversely, the term "enriched" or "increased" is synonymous with greater than originally present.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 mol % of a comonomer", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

The term "inner" or "innermost", as used herein, refers to being in the direction of the center or interior. Conversely, the term "outer" or "outermost", as used herein, refers to being in the direction away from the center, or towards the exterior.

For convenience, many elements of the present invention are discussed separately, lists of options may be provided and numerical values may be in ranges; however, for the purposes of the present disclosure, that should not be considered as a limitation on the scope of the disclosure or support of the present disclosure for any claim of any combination of any such separate components, list items or ranges. Unless stated otherwise, each and every combination possible with the present disclosure should be considered as explicitly disclosed for all purposes.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

Pipe Configuration

One embodiment of the present invention is depicted in FIG. 1.

Referring to FIG. 1, the pipe (10) comprises a sheath layer (12), a reinforcing layer (14) contained by the sheath layer (12), an inner layer (16) contained by the reinforcing layer (14), and a hollow portion (24) contained by the inner layer (16), wherein the pipe is flexible, and wherein the inner layer (16) is a multilayer article having an innermost layer (22) containing the hollow portion (24), wherein the innermost layer (22) is a layer of the ethylene-vinyl alcohol copolymer resin composition.

Inner Layer

The inner layer of the flexible pipe in this present invention is a multilayer article comprising at least a layer of an ethylene-vinyl alcohol copolymer resin located as an innermost layer (22). The inner layer will contain will contain one or more other types of layers, for example, adhesive layers and/or hydrophobic thermoplastic resin composition layers.

In the embodiment of FIG. 1, the inner layer (16) comprises a hydrophobic layer (18) of a hydrophobic thermoplastic resin composition between the reinforcing layer (14) and the innermost layer (22), and a tie layer (20) between the hydrophobic layer (18) and innermost layer (22). Further details are provided below.

Examples of the layer structure of the inner layer are shown below, in which the EVOH resin composition layer as (X), the (each) adhesive resin layer as (AD) (may be the same or different) and each hydrophobic thermoplastic resin composition layer as (PO). When the multilayer structure described below is used for the inner layer, the rightmost layer is the innermost layer (in contact with hollow portion (24)), and the leftmost layer is the outermost layer of the inner layer which is in contact with the outer outer layer(s) of the flexible pipe.

Three layers: (PO)/(AD)/(X)
Four layers: (PO)/(PO)/(AD)/(X)
Five layers: (PO)/(AD/(X)/(AD)/(X)

In general, the thickness of the inner layer should be about 5 mm or more. When the thickness of the inner layer is less than about 5 mm, the flat strength of the flexible pipe of the present invention is lowered. On the other hand, the thickness of the inner layer is usually about 50 mm or less, or about 20 mm or less. Here, the flat strength is the compressive strength of the flexible pipe with respect to compression from the direction perpendicular to the longitudinal direction of the flexible pipe (the direction in which the gas flows).

The thickness of each EVOH layer in the inner tubular layer is not particularly limited, but is typically from about 15 μm, or from about 20 μm, or from about 30 μm, to about 600 μm, or to about 400 μm, or to about 200 μm.

The thickness of each AD layer in the inner tubular layer is not particularly limited, but is typically from about 15 μm, or from about 20 μm, or from about 30 μm, to about 600 μm, or to about 400 μm, or to about 200 μm.

The thickness of each PO layer in the inner tubular layer is not particularly limited, but is typically from about 500 μm, or from about 1000 μm, or from about 1500 μm, to about 20000 μm, or to about from 15000 μm, or to about 10000 μm.

Alternatively, other functional layers can be incorporated into the inner layer, such as the materials provide heat sealability and scuff resistance and toughness.

EVOH Resin Composition

The innermost layer of the flexible pipe in accordance with the present invention is formed from an EVOH resin composition.

The EVOH of the EVOH resin composition is a copolymer having as a main structural unit an ethylene unit and a vinyl alcohol unit.

The EVOH desirably has, as a lower limit of ethylene unit content (a proportion of the number of ethylene units to the total number of monomer units in the EVOH), an ethylene unit content of about 20 mol % or greater, or about 22 mol % or greater, or about 24 mol % or greater. On the other hand, the EVOH desirably has, as an upper limit of ethylene unit content, an ethylene unit content of about 60 mol % or less, or about 55 mol % or less, or about 50 mol % or less. The EVOH having an ethylene unit content of no less than the lower limit gives a crosslinked product an excellent oxygen barrier properties in high humidity and gives excellent melt moldability. In addition, the EVOH having an ethylene unit content of no greater than the upper limit gives excellent oxygen barrier properties.

The EVOH typically has, as a lower limit of degree of saponification (a proportion of the number of vinyl alcohol units to the total number of the vinyl alcohol units and vinyl ester units in the EVOH), a degree of saponification of about 80 mol % or greater, or about 95 mol % or greater, or about 99 mol % or greater. On the other hand, the EVOH typically has, as an upper limit of degree of saponification, a degree of saponification of (substantially) 100 mol %, or about 99.99 mol % or less. The EVOH having a degree of saponification of no less than the lower limit gives excellent oxygen barrier properties and thermal stability.

A method of preparing the ethylene-vinyl alcohol copolymer is not particularly limited, and may include well-known preparing methods. For example, in a general method, an ethylene-vinyl ester copolymer obtained by copolymerizing ethylene and vinyl ester monomer is saponified under the presence of a saponification catalyst, in an organic solvent including alcohol.

Examples of the vinyl ester monomer may include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, and vinyl benzoate. Particularly, vinyl acetate is preferable.

A method of copolymerizing ethylene and vinyl ester monomer may include well-known methods such as solution polymerization, bulk polymerization, suspension polymerization, and emulsion polymerization. As a polymerization initiator, an azo-based initiator, peroxide-based initiator, redox-based initiator, and the like may be properly selected according to a polymerization method. The copolymerization may be performed under presence of thiol compounds such as thioacetic acid and mercaptopropionic acid, or other chain-transfer agents.

For the saponification reaction, alcoholysis, hydrolysis, and the like, which uses a well-known alkali catalyst or acidic catalyst as a saponification catalyst in an organic solvent, may be used. In particular, a saponification reaction using a caustic soda catalyst with methanol as a solvent is simple and easy, and thus, most preferable.

The EVOH used in the EVOH resin composition may be a combination of two or more different types of EVOH. For example, the EVOH can be composed of a mixture of two or more types of EVOH that are different in ethylene unit content, with the combination having an ethylene content that is calculated as an average value from a mixed mass ratio. In this case, the difference between two types of EVOH that have different ethylene unit contents is typically about 30 mol % or less, or about 20 mol % or less, or about 15 mol % or less.

Similarly, the EVOH can be composed of a mixture of two or more types of EVOH that are different in degree of saponification, with the combination having a degree of saponification that is calculated as an average value from a mixed mass ratio. In this case, the difference in degree of saponification is typically about 7% or less, or about 5% or less.

The ethylene unit content and the degree of saponification of the EVOH can be determined by nuclear magnetic resonance (NMR) analysis by conventional methods as recognized by one or of ordinary skill in the relevant art.

The EVOH typically has, as a lower limit of a melt flow rate at 190° C. (a measured value at a load of 2160 g in accordance with JIS K 7210), a melt flow rate of about 0.1 g/10 min or more, or about 0.5 g/10 min or more, or about 1.0 g/10 min or more. On the other hand, the EVOH typically has, as an upper limit of a melt flow rate, a melt flow rate of about 50 g/10 min or less, or about 30 g/10 min or less, or about 15 g/10 min.

In the case of EVOH has melting point above 190° C., a melt flow rate needs to be measured at 210° C. The EVOH typically has, as a lower limit of a melt flow rate at 210° C. (a measured value at a load of 2160 g in accordance with JIS K 7210), a melt flow rate of about 0.3 g/10 min or more, or about 1.0 g/10 min or more, or about 3.0 g/10 min or more. On the other hand, the EVOH typically has, as an upper limit of a melt flow rate, a melt flow rate of about 100 g/10 min or less, or about 50 g/10 min or less, or about 30 g/10 min.

The EVOH having a melt flow rate value in the above range improves melt kneadability and melt moldability of a resultant resin composition.

A modified EVOH can also be used. For example, a modified EVOH can have at least one structural unit selected from, for example, structural units (I) and (II) shown below.

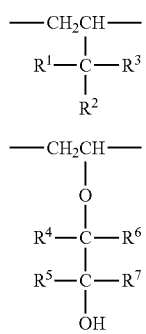

When present, such the structural unit are present at a ratio of from about 0.5 mol % to about 30 mol % based on the total structural units. Such a modified EVOH may improve flexibility and moldability of a resin or a resin composition, the interlayer adhesion, stretchability and thermoformability of the inner liner.

Each of $R^1$, $R^2$ and $R^3$ in the above formula (I) independently represents a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms, or a hydroxy group. Also, one pair of $R^1$, $R^2$ or $R^3$ may be combined together (excluding a pair of $R^1$, $R^2$ or $R^3$ in which both of them are hydrogen atoms). Further, the aliphatic hydrocarbon group having 1 to 10 carbon atoms, the alicyclic hydrocarbon group having 3 to 10 carbon atoms, or the aromatic hydrocarbon group having 6 to 10 carbon atoms may have the hydroxy group, a carboxy group or a halogen atom. On the other hand, each of $R^4$, $R^5$, $R^6$ and $R^7$ in the above formula (II) independently represents the hydrogen atom, the aliphatic hydrocarbon group having 1 to 10 carbon atoms, the alicyclic hydrocarbon group having 3 to 10 carbon atoms, the aromatic hydrocarbon group having 6 to 10 carbon atoms, or the hydroxy group. $R^4$ and $R^5$, or $R^6$ and $R^7$ may be combined together (excluding when both $R^4$ and $R^5$ or both $R^5$ and $R^7$ are hydrogen atoms). Also, the aliphatic hydrocarbon group having 1 to 10 carbon atoms, the alicyclic hydrocarbon group having 3 to 10 carbon atoms, or the aromatic hydrocarbon group having 6 to 10 carbon atoms may have the hydroxy group, an alkoxy group, the carboxy group or the halogen atom.

In another example, the following modified EVOH can be used as the EVOH, wherein the modified EVOH copolymer is represented by a following formula (III), contents (mol %) of a, b, and c based on the total monomer units that satisfy following formulae (1) through (3), and a degree of saponification (DS) defined by a following formula (4) is not less than about 90 mol %.

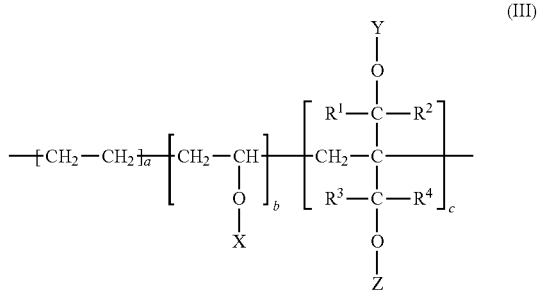

$$18 \leq a \leq 55 \quad (1)$$

$$0.01 \leq c \leq 20 \quad (2)$$

$$[100-(a+c)] \times 0.9 \leq b \leq [100-(a+c)] \quad (3)$$

$$DS = [(\text{Total Number of Moles of Hydrogen Atoms in } X, Y, \text{ and } Z)/(\text{Total Number of Moles of } X, Y, \text{ and } Z)] \times 100 \quad (4)$$

In the formula (III), each of $R^1$, $R^2$, $R^3$ and $R^4$ independently denotes a hydrogen atom or an alkyl group having a carbon number of from 1 to 10, and the alkyl group may include a hydroxyl group, an alkoxy group, or a halogen atom. Each of X, Y, and Z independently denotes a hydrogen atom, a formyl group, or an alkanoyl group having a carbon number of from 2 to 10.

The EVOH may also contain, as a copolymer unit, a small amount of another monomer unit other than the ethylene unit and the vinyl alcohol unit within a range not to inhibit the purpose of the present invention. Examples of such a monomer include α-olefins such as propylene, 1-butene, isobutene, 4-methyl-1-pentene, 1-hexene, and 1-octene; unsaturated carboxylic acids such as itaconic acid, methacrylic acid, acrylic acid, and maleic acid, salts thereof, partial or complete esters thereof, nitriles thereof, amides thereof, and anhydrides thereof; vinylsilane compounds such as vinyltrimethoxysilane, vinyltriethoxysilane, vinyltri (2-methoxyethoxy)silane, and 7-methacryloxypropyltrimethoxysilane; unsaturated sulfonic acids or salts thereof; unsaturated thiols; and vinylpyrrolidones.

The EVOH resin composition may contain other optional components within a range not to impair the effects of the present invention. Examples of such other components include, for example, a boron compound, an alkali metal salt, a phosphoric acid compound, an oxidizable substance, another polymer, an oxidization accelerator, and another additive.

Addition of a boron compound to the EVOH resin composition may be advantageous in terms of improving melt viscosity of the EVOH and obtaining a homogenous coextrusion molded product or a coinjection molded product. Examples of suitable boron compounds include boric acids, a boric acid ester, a boric acid salt, and boron hydrides. Specific examples of the boric acids include orthoboric acid (hereinafter, also merely referred to as "boric acid"), metaboric acid and tetraboric acid. Specific examples of the boric acid ester include triethyl borate and trimethyl borate. Specific examples of the boric acid salt include alkali metal salts and alkaline earth metal salts of the above various types of boric acids, and borax. Among these compounds, orthoboric acid is preferred.

When a boron compound is added, the content of the boron compound in the composition is typically from about 20 ppm, or from about 50 ppm, to about 2000 ppm, or to about 1500 ppm, in terms of the boron element equivalent. The content of the boron compound in this range can give EVOH that is produced while torque variation is suppressed during heat melting.

The EVOH resin composition may also contain an alkali metal salt in an amount of from about 5 ppm, or from about 20 ppm, or from about 30 ppm, to about 5000 ppm, or to about 1000 ppm, or to about 500 ppm, in terms of the alkali metal element equivalent. The resin composition containing an alkali metal salt in the above range can improve the interlayer adhesiveness and the compatibility. An alkali metal is exemplified by, for example, lithium, sodium, and potassium, and the alkali metal salt is exemplified by, for example, an aliphatic carboxylic acid salt, an aromatic carboxylic acid salt, a phosphoric acid salt, and a metal complex of the alkali metal. Examples of the alkali metal salt include sodium acetate, potassium acetate, sodium phosphate, lithium phosphate, sodium stearate, potassium stearate, and sodium salts of ethylene diamine tetraacetic acid. Especially, sodium acetate, potassium acetate, and sodium phosphate are preferred.

The EVOH resin composition may also contain a phosphoric acid compound in an amount of from about 1 ppm, or from about 5 ppm, or from about 10 ppm, to about 500 ppm, or to about 300 ppm, or to about 200 ppm, in terms of the phosphate radical equivalent. Blending the phosphoric acid compound in the above range can improve the thermal stability of the EVOH and suppress, in particular, generation of gel-state granules and coloring during melt molding for a long period of time.

The type of the phosphoric acid compound added to the EVOH resin composition is not particularly limited, and there can be used, for example, various types of acids such as phosphoric acid and phosphorous acid, and salts thereof. The phosphoric acid salt may be any form of a primary phosphoric acid salt, a secondary phosphoric acid salt, and a tertiary phosphoric acid salt. Although the cation species of the phosphoric acid salt is not also particularly limited, an alkali metal or an alkaline earth metal is preferred as the cation species. Especially, the phosphorus compound is preferably added in the form of sodium dihydrogen phosphate, potassium dihydrogen phosphate, disodium hydrogen phosphate or dipotassium hydrogen phosphate.

The EVOH resin composition may also contain various types of other additives within a range not to impair the effects of the present invention. Examples of such other additives include an antioxidant, a plasticizer, a heat stabilizer (melt stabilizer), a photoinitiator, a deodorizer, an ultraviolet ray absorber, an antistatic agent, a lubricant, a colorant, a filler, a drying agent, a bulking agent, a pigment, a dye, a processing aid, a fire retardant, and an anti-fogging agent.

The EVOH resin composition layer may also contain an elastomer. Thereby, even if the flexible pipe is deformed in a direction perpendicular to the direction which the gas flows, deterioration of the gas barrier property is suppressed. Examples of the elastomer include acrylic elastomers; olefin elastomers such as ethylene-butene copolymers and ethylene-propylene copolymers; urethane elastomers; urethane-ethylene/butylene-butadiene block copolymers (SEBS), butadiene-isobutylene-butadiene block copolymer (SIBS), styrene-ethylene/propylene-butadiene block copolymer (SEPS), urethane-butadiene-butadiene block copolymer (SBS), styrene elastomers such as styrene-isoprene-styrene block copolymer (SIS); conjugated diene elastomers such as hydrogenated products of styrene-butadiene copolymers, acrylonitrile-butadiene copolymers, acrylate-butadiene copolymers, silicone elastomers such as polyorganosiloxanes; ethylene ionomer copolymers; polybutadiene, polyisoprene, butadiene-isoprene copolymer, polychloroprene are used. These can be used alone or in combination. Among these, the elastomer is preferably at least one selected from the group consisting of acrylic elastomers, olefin elastomers, urethane elastomers, styrene elastomers, and conjugated diene elastomers. An acrylic elastomer or a conjugated diene elastomer is more preferable.

The EVOH resin composition layer may also an antioxidant. As melting point of antioxidant, 170° C. or less is preferable, for example. When the resin composition is produced by melt mixing, if the melting point of the antioxidant exceeds 170° C., the antioxidant does not melt and the antioxidant may be localized and the high-density portion of the antioxidant may be colored.

The molecular weight of the antioxidant is preferably 300 or more. When the molecular weight of the antioxidant is less than 300, the antioxidant may bleed out on the surface of the resulting flexible pipe, and the thermal stability of the resin composition may decrease. The molecular weight of the antioxidant is more preferably 400 or more, and even more preferably 500 or more. On the other hand, from the viewpoint of dispersibility, the upper limit of the molecular weight of the antioxidant is, for example, preferably 8000 or less, more preferably 6000 or less, and further preferably 4000 or less.

Hydrophobic Layer

In order to avoid moisture, which can reduce the barrier property of the EVOH resin composition, a hydrophobic layer, such as hydrophobic layer (18) in FIG. 1, comprising a hydrophobic thermoplastic resin composition is provided. The hydrophobic resin composition comprises a predominant amount of one or more hydrophobic thermoplastic resins.

Examples of suitable hydrophobic thermoplastic resins include polyolefin resins; polyethylenes such as linear low-density polyethylenes, low-density polyethylenes, ultra-low-density polyethylenes, ultra-low-density linear polyethylenes, medium-density polyethylenes, and high-density polyethylenes; polyethylene copolymer resins such as ethylene-α-olefin copolymers; polypropylene resins such as polypropylenes, ethylene-propylene (block and random) copolymers, and propylene-α-olefin (C4-20 α-olefin) copolymers; polybutenes; polypentenes; graft polyolefins obtained by graft modification of these polyolefins with an unsaturated carboxylic acid or an ester thereof; cyclic polyolefin resins; ionomers; an ethylene-vinyl acetate copolymer; an ethylene-acrylic acid copolymer; an ethylene-acrylic acid ester copolymer; a polyester resin; a polyamide resin; polyvinyl chloride; polyvinylidene chloride; acrylic resins; polystyrenes; vinyl ester resins; polyester elastomers; polyurethane elastomers; halogenated polyolefins such as chlorinated polyethylenes and chlorinated polypropylenes; and aromatic and aliphatic polyketones. In terms of mechanical strength and molding processability, polyolefin resins are preferable, and polyethylenes and polypropylenes are particularly preferable among these.

For the hydrophobic thermoplastic resin composition, an anti-ultraviolet agent is preferably added. Examples of the anti-ultraviolet agent include an ultraviolet absorber, a light stabilizer, and a colorant.

The content of the anti-ultraviolet agent in the hydrophobic thermoplastic resin is typically from about 1% by weight, or about 2% by weight, or about 3% by weight, to about 10% by weight, or to about 8% by weight, or to about 5% by weight, based on the total weight of the hydrophobic thermoplastic resin composition. When the content is less than these ranges, the hydrophobic thermoplastic resin composition tends to be degraded by ultraviolet light. When the content is greater than these ranges, the hydrophobic thermoplastic resin composition has poor mechanical strength.

Regarding the melt viscosity of the hydrophobic thermoplastic resin composition, the MFR at 190° C. and a 2160 g load typically has a lower limit of about 0.01 g/10 minutes, or about 0.02 g/10 minutes, and typically has an upper limit of about 100 g/10 minutes, or about 60 g/10 minutes. The difference between the MFR of the hydrophobic thermoplastic resin composition and the MFR of the EVOH resin composition is preferably small. When the melt viscosity of the hydrophobic thermoplastic resin composition is as described above, an excellent multilayer article without layer turbulence can be obtained.

Adhesive Layer

As indicated above, the inner layer may contain at least one adhesive layer, such as adhesive layer (20) in FIG. 1. Suitable adhesive layers are generally known to those of ordinary skill in the art based on the two layers being adhered.

In one embodiment, the adhesive layer(s) is an acid-functionalized polymer resin composition. For adhesion between the layer of the EVOH resin composition (EVOH resin composition layer) and the layer of the hydrophobic thermoplastic resin composition, an adhesive resin layer is typically interposed between these layers. Typical examples of the adhesive resin include carboxyl group-containing modified polyolefin resins obtained by chemically binding an unsaturated carboxylic acid or an anhydride thereof to a polyolefin resin. Specific examples of the adhesive resin include polyethylenes modified with maleic anhydride, polypropylenes modified with maleic anhydride, a maleic anhydride-modified ethylene-ethyl acrylate copolymer, and a maleic anhydride-graft-modified ethylene-vinyl acetate copolymer. In terms of mechanical strength and molding processability, polyethylenes modified with maleic anhydride and polypropylenes modified with maleic anhydride are preferable, and polyethylenes modified with maleic anhydride are particularly preferable among these.

Regarding the melt viscosity of the adhesive resin, the MFR at 190° C. and a 2160-g load typically has a lower limit of about 0.1 g/10 minutes, or about 0.2 g/10 minutes, and typically has an upper limit of about 100 g/10 minutes, or about 60 g/10 minutes. The difference between the MFR of the adhesive resin and the MFR of the EVOH resin composition is preferably small. When the melt viscosity of the adhesive resin is as described above, an excellent multilayer article having excellent adhesive strength without any layer turbulence can be obtained.

Methods of Producing Inner Layer

Methods of producing the inner layer in accordance with the present invention are broadly classified into a process involving melting the EVOH resin composition, adhesive resin composition and hydrophobic thermoplastic resin composition, then molding the resultant melt (a melt molding process), for example. The melt molding procedure for obtaining the molded product is not limited, often exemplified by co-extrusion molding, extrusion coating, and the like. Solution coating may also be used.

Reinforcing Layer

The reinforcing layer surrounds and is positioned radially outwardly of the outer surface of the inner tubular layer, such as reinforcing layer (14) of FIG. 1.

The reinforcing layer can be made up of reinforcing fibers which are substantially continuous along the length of the flexible pipe. The reinforcing layer will have an inner surface and an outer surface, and may include multiple layers.

The fibers in the reinforcing layers react to axial and radial loads on the pipe. Primary load is in the fiber tensile direction because little side load is typically induced under normal operating conditions of the flexible pipe. The flexible pipe, being used to contain pressurized fluid with the prominent condition being internal pressure containment, can have the fiber chosen to favor the radial tensile direction. Other factors such as installation pull force (axial loading) and loads from spooling and unspooling for transport and installation in the field can also be taken into account for the fiber choice.

The fibers in the reinforcing layers may be selected from one or more of various materials, such as glass (such as E-glass, E-CR glass, or S-glass), carbon, nylon, polyester, aramid, metal, or other suitable material with sufficient tensile strength. The material forming the fibers can also be chosen based on its resistance to chemicals, such as hydrocarbon and water that may come into contact with the flexible pipe during its use. Additionally, the fibers could be used as single strands or could be combined, as by twisting or braiding with other fibers to form yarns made up of bundles of fibers which are then wound helically around the inner tubular layer to form the first reinforcing layer or wound around the first reinforcing layer to form a second reinforcing layer.

In one embodiment, the reinforcing layer includes helical clockwise and counterclockwise windings of unbonded, unencapsulated fibers that are substantially free floating between the inner tubular layer and the outer sheath with no bonding to adjacent fibers. In this manner, the separate fibers in the first reinforcing layer and the second reinforcing layer remain independent and can react to loads in conjunction with each other rather than as a single rigid body.

Outer Sheath Layer

The outer sheath encloses the inner layer and the reinforcing layer(s), the outer sheath has an inner surface and an outer surface. The outer sheath may closely conform to the outside contours of the reinforcing layer.

The material of the outer sheath can be selected to primarily protect the reinforcing layers from damage, such as by abrasion, and assist in stabilizing and holding the fibers of the reinforcing layers in place.

In one aspect, the outer sheath may be made of the same hydrophobic thermoplastic composition as the inner tubular layer.

In one aspect, the material selection of the outer sheath may be based on factors such as abrasion resistance, UV exposure, cost, degradation from environmental effects (i.e. ultraviolet light, weather, etc.), the chemicals that may come in contact with the outer sheath, etc.

Method of Producing the Flexible Pipe

As mentioned above, the flexible pipe has an inner layer, a reinforcing layer and an outer sheath. The inner layer may have an inner surface, defining an inner diameter, and an outer surface. The reinforcing layer may surround the inner layer, typically in contact with the outer surface of the inner layer. The outer sheath layer surrounds the reinforcing layer. In particular, reinforcing layer is in the annulus between the inner layer and outer sheath layer. In one aspect, the outer sheath layer can define the outer surface of the pipe, for example, being exposed directly to the environment surrounding the flexible pipe. Alternately, there may be a coating on the outer sheath layer. There can be other layers as desired, for example, any pipe may include one or more of: outer insulation, inner coatings or other layers such as barrier layers or further reinforcing layers, between the inner tubular layer and the outer sheath layer.

In an aspect, the inner layer can be obtained by melt molding as described above. The fibers of the reinforcing layers can be wound over the inner layer when the inner layer is in the soft or semi-uncured state, causing the material of the inner tubular layer to partially mold around and adhere to some degree to the fibers of the reinforcing layers. Then, the outer sheath can be applied over the reinforcing layers such as by extrusion, spraying, dipping, tape winding, shrink wrapping, braiding, etc.

Desirably, the pipe is substantially uniform in construction along its length.

Method of Transporting High-Pressure Fluids

Where previous conventional flexible reinforced pipes may be ideally suited for transporting of pressurized fluids having an upper level temperature of around 60° C., in one aspect, the flexible pipe of the present invention can transport pressurized fluids with temperatures of from about 60° C. to about 120° C., and mitigates and/or addresses gas permeation through the inner layer.

The flexible pipe can be used to transport pressurized fluids with pressure of up to about 1500 psig (about 10 MPa), or generally ranging from about 200 psig (about 1.3 MPa) to about 1500 psig (about 10 MPa).

In the flexible pipe of the present invention, the inner layer can be used to primarily prevent the diffusion of the fluid outwardly from the inner diameter. The reinforcing layers can act to counteract the internal pressure imposed on the pipe by pressurized fluid passing through the flexible pipe.

Applications of the flexible pipe of the present invention are not particularly limited, and include transportation of oil, water, gases and many other high-pressure fluids. Specifically, the flexible pipe of the present invention is particularly excellent for gases requiring high pressure. The high-pressure gas may be any of toxic gas, combustible gas, gases other than toxic gas or combustible gas. As described above, the present invention is suitable for using under high pressure, so that gas leakage hardly occurs, and is suitable for, for example, a toxic gas and a flammable gas. The toxic gas is not particularly limited, and examples thereof include chlorine gas. As combustible gas, hydrogen gas etc. are mentioned. Other gases are not particularly limited, and examples thereof include helium gas, nitrogen gas, and carbon dioxide gas.

EXAMPLES

The present invention is more specifically described by way of examples. The scope of the present invention, however, is not limited to these examples.

Materials

EVOH-1: EVAL™ FP101B, Kuraray America, Inc., Houston, Texas USA (Ethylene Content: 32 mol %, Saponification degree 99.9%, MFR=1.6 g/10 min)

EVOH-2: EVAL™ EP171B, Kuraray America, Inc., Houston, Texas USA (Ethylene Content: 44 mol %, Saponification degree 99.9%, MFR=1.7 g/10 min)

AD-1: Maleic anhydride modified polyethylene: ADMER™ NE072E, Mitsui Chemicals America. Inc., Rye Brook, New York USA HDPE-1: High-density polyethylene copolymer: TUB121B, INEOS Olefins & Polymers USA, League City, Texas USA Example 1

Preparation of Multilayer Pine

Using a five material five layer multilayer pipe co-extrusion line (manufactured by Davis-Standard, LLC), an inner pipe having HDPE-1/AD-1/EVOH-1 structure with inner diameter of 77 mm was extruded from the circular die. The pipe was cooled down with the water bath set at 5° C. Extrusion conditions are summarized below.

Extruder A (in): Not used
Extruder B: Not used
Extruder C
Material: EVOH-1
Extrusion condition (° C.): Z1=220, Z2=225, Z3=225, Z4=225, Adapter=225, Die=240
Extruder D
Material: AD-1
Extrusion condition (° C.): Z1=205, Z2=195, Z3=215, Adapter=215, Die=215
Extruder E (out):
Material: HDPE-1
Extrusion condition (° C.): Z1=190, Z2=200, Z3=205, Z4=220, Adapter=210, Die=210

After that, the inner pipe was heated up at 110° C. and a fiber reinforced layer was wound over the inner pipe.

Then, using the pipe coating system having a crosshead die (manufactured by Davis-Standard, LLC), HDPE-1 was coated over the pipe. Extrusion conditions were summarized below. The pipe was cooled down with the water bath set at 5° C.

Material: HDPE-1
Extrusion condition (° C.): Z1=190, Z2=200, Z3=205, Z4=220, Adapter=220, Die=220

Then, the multilayer pipe having HDPE/Glass fiber/Inner pipe with an outside diameter of 101 mm was obtained. The total thickness of pipe was 24 mm. Layer thickness was HDPE-1/Glass fiber/Inner pipe=12 mm/2 mm/10 mm and inner pipe thickness was HDPE-1/AD-1/EVOH-1=9000 μm/500 μm/500 μm.

Rapid Gas Decompression Test

The multilayer pipe was cut into 15 cm long pieces. Then, the pipe was set for the rapid gas decompression testing. The pipe was located in the oven set at 82° C. Both sides of the pipe were capped for pressurizing. One side was connected to $CO_2$ gas cylinder and equipped with the pressure sensor. The other side had a valve to maintain and release the pressure. $CO_2$ was flowed into the pipe to pressurize it to 10 MPa. After 24 hours of soaking, pressure was released at 10 MPa/min. The pipe dwelled at ambient pressure for 1 hour. The pressurizing/release was repeated for 5 cycle. Then, the appearance of pipe was evaluated by criteria below. The results are summarized in Table 1.

A: No Change
B: Expanding
C: Swelling
D: Swelling and Expanding

Example 2

Example 1 can be repeated except that inner pipe thickness is prepared as HDPE-1/AD-1/EVOH-1=9000 μm/650 μm/350 μm.

Rapid gas decompression test can be done in the same manner as Example 1. The expected test results are shown in Table 1.

Example 3

Example 1 was repeated except that inner pipe thickness was prepared as HDPE-1/AD-1/EVOH-1=9000 μm/800 μm/200 μm.

Rapid gas decompression test was done in the same manner as Example 1. The test results are shown in Table 1.

Example 4

Example 1 can be repeated except that inner pipe thickness is prepared as HDPE-1/AD-1/EVOH-1=9000 μm/950 μm/50 μm.

Rapid gas decompression test can be done in the same manner as Example 1. The expected test results are shown in Table 1.

Example 5

Example 1 can be repeated except that inner pipe thickness is prepared as HDPE-1/AD-1/EVOH-1=9000 μm/980 μm/20 μm.

Rapid gas decompression test can be done in the same manner as Example 1. The expected test results are shown in Table 1.

Example 6

Example 1 can be repeated except that EVOH-2 is used for the inner pipe.

Rapid gas decompression test can be done in the same manner as Example 1. The expected test results are shown in Table 1.

Comparative Example 1

Example 1 was repeated except that EVOH-1 and AD-1 were not used for the inner pipe and glass fiber was not wound over the inner pipe. Extrusion conditions for inner pipe were summarized below.
Extruder A (in): Not used
Extruder B: Not used
Extruder C: Not used
Extruder D: Not used
Extruder E (out)
Material: HDPE-1
Extrusion condition (C): Z1=190, Z2=200, Z3=205, Z4=220, Adapter=210, Die=210

HDPE-1 was coated over the inner pipe as same manner as Example 1.

The multilayer pipe having HDPE/Inner pipe with outside diameter of 101 mm was obtained. The total thickness of pipe was 24 mm. Layer thickness were HDPE-1/Inner pipe=14 mm/10 mm and inner pipe thickness was HDPE-1=10,000 μm.

Rapid gas decompression test was done in the same manner as Example 1. The test results are shown in Table 1.

Comparative Example 2

Example 1 was repeated except that EVOH-1 and AD-1 were not used for the inner pipe. Extrusion conditions for inner pipe were the same as Comparative Example 1.

Glass fiber reinforced layer was wound over the inner pie and HDPE-1 was coated over the pipe as same manner as Example 1.

Then, the multilayer pipe having HDPE/Glass fiber/inner pipe with outside diameter of 101 mm was obtained. The total thickness of pipe was 24 mm. Layer thickness were HDPE-1/Glass fiber/Inner pipe=12 mm/2 mm/10 mm and inner pipe thickness was HDPE-1=10,000 μm.

Rapid gas decompression test was done in the same manner as Example 1. The test results are shown in Table 1.

Comparative Example 3

Example 1 was repeated except that the inner pipe having HDPE-1/AD-1/EVOH-1/AD-1/HDPE-1 structure with inner diameter of 77 mm of was extruded. Extrusion conditions for the inner pipe were summarized below.
Extruder A (in)
Material: HDPE-1
Extrusion condition (° C.): Z1=190, Z2=200, Z3=205, Z4=220, Adapter=210, Die=210
Extruder B
Material: AD-1
Extrusion condition (° C.): Z1=205, Z2=195, Z3=215, Adapter=215, Die=215
Extruder C
Material: EVOH-1
Extrusion condition (° C.): Z1=220, Z2=225, Z3=225, Z4=225, Adapter=225, Die=240
Extruder D
Material: AD-1
Extrusion condition (° C.): Z1=205, Z2=195, Z3=215, Adapter=215, Die=215
Extruder E (out)
Material: HDPE-1
Extrusion condition (° C.): Z1=190, Z2=200, Z3=205, Z4=220, Adapter=210, Die=210

Then the multilayer pipe having HDPE/Glass fiber/Inner pipe with outside diameter of 101 mm was obtained. The total thickness of pipe was 24 mm. Layer thickness were HDPE-1/Glass fiber/Inner pipe=12 mm/2 mm/10 mm and inner pipe thickness was HDPE-1/AD-1/EVOH-1/AD-1/HDPE-1=4500 μm/250 μm/500 μm/250 μm/4500 μm.

Rapid gas decompression test was done in the same manner as Example 1. The test results are shown in Table 1.

Comparative Example 4

Example 1 can be repeated except that glass fiber is not wound over the inner pipe. The multilayer pipe having HDPE/Inner pipe with outside diameter of 101 mm can be obtained. The total thickness of pipe would be 24 mm. Layer thickness would be HDPE-1/Inner pipe=14 mm/10 mm and inner pipe thickness would be HDPE-1/AD-1/EVOH-1=9000 μm/500 μm/500 μm.

Rapid gas decompression test can be done in the same manner as Example 1. The expected test results are shown in Table 1.

As shown in Table 1, Examples 1-6 show (or should show) good results on the rapid gas decompression testing because of EVOH layer prevented the pipe from absorbing $CO_2$.

On the other hand, Comparative Example 1 which did not contain fiber reinforced layer and EVOH layer in the innermost layer of the inner pipe, showed swelling and expanding on the rapid gas decompression testing because of absorption of $CO_2$ and low pressure resistance.

Comparative Example 2 which did not contain EVOH layer in the innermost layer of the inner pipe, showed swelling on the rapid gas decompression testing because of absorption of $CO_2$.

Comparative Example 3 which had EVOH layer in the inner pipe but the EVOH layer was located in the middle layer of the inner pipe, showed swelling on the rapid gas decompression testing because of absorption of $CO_2$ in HDPE at the inner most layer.

Comparative Example 4 which would not contain fiber reinforced layer, is expected to show expanding on the rapid gas decompression testing because of low pressure resistance even if the EVOH layer is located in the inner most layer.

| | Pipe structure | Inner pipe (out)-(in) | EVOH Grades | EVOH thickness μm | RGD test results |
|---|---|---|---|---|---|
| E 1 | HDPE/GF/Inner pipe | HDPE/tie/EVOH | EVOH-1 | 500 | A |
| E 2 | HDPE/GF/Inner pipe | HDPE/tie/EVOH | EVOH-1 | 350 | A (not tested, expected result) |
| E 3 | HDPE/GF/Inner pipe | HDPE/tie/EVOH | EVOH-1 | 200 | A |
| E 4 | HDPE/GF/Inner pipe | HDPE/tie/EVOH | EVOH-1 | 50 | A (not tested, expected result) |
| E 5 | HDPE/GF/Inner pipe | HDPE/tie/EVOH | EVOH-1 | 20 | A (not tested, expected result) |
| E 6 | HDPE/GF/Inner pipe | HDPE/tie/EVOH | EVOH-2 | 500 | A (not tested, expected result) |
| CE 1 | HDPE/Inner pipe | HDPE | — | — | D |
| CE 2 | HDPE/GF/Inner pipe | HDPE | — | — | C |
| CE 3 | HDPE/GF/Inner pipe | HDPE/tie/EVOH/tie/HDPE | EVOH-1 | 500 | C |
| CE 4 | HDPE/Inner pipe | HDPE/tie/EVOH | EVOH-1 | 500 | B (not tested, expected result) |

The invention claimed is:

1. A pipe, comprising a layer structure of, in order from an outer side, a sheath layer, a reinforcing layer, an inner layer, and a hollow portion contained by the inner layer, wherein
the pipe is flexible,
the inner layer is a multilayer article having a 3-layer structure (PO)/(AD)/(X),
wherein
(X) is an innermost layer containing the hollow portion and comprising, as a resin only an ethylene-vinyl alcohol copolymer,
(PO) is a layer of a polyolefin resin composition,
(AD) is a layer of an adhesive resin composition, and
an ethylene unit content of the ethylene-vinyl alcohol copolymer is 20 mol % or more and 60 mol % or less.

2. The pipe of claim 1, wherein the ethylene-vinyl alcohol resin is an ethylene-vinyl alcohol copolymer having a degree of saponification of about 99 mol % or greater.

3. The pipe of claim 1, wherein the multilayer article has an average thickness of from about 5 mm to about 50 mm.

4. The pipe of claim 1, wherein the innermost layer of the ethylene-vinyl alcohol copolymer resin has an average thickness of from about 15 μm to about 600 μm.

5. A method of transporting high-pressure fluid, comprising:
transporting the fluid through the pipe according to claim 1 at a pressure of about 1500 psig or less.

* * * * *